No. 623,716. Patented Apr. 25, 1899.
A. J. HILL.
DETERGENT.
(Application filed Apr. 20, 1897.)
(No Model.)
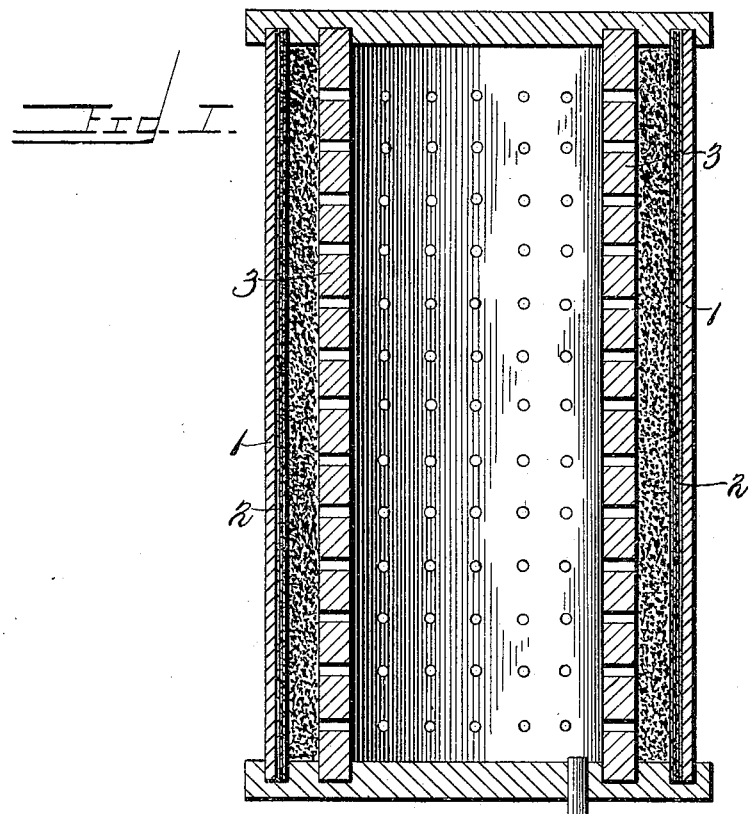
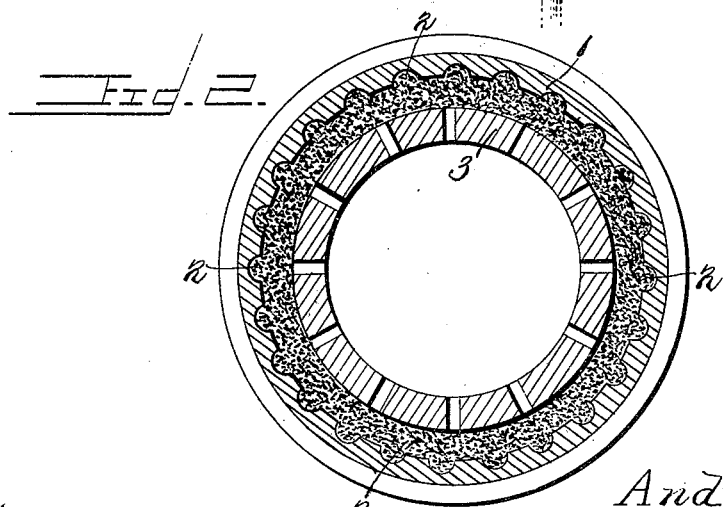
Witnesses
R. A. Shepard.
Inventor
Andrew J. Hill.
By his Attorneys,
C. A. Snow & Co.

UNITED STATES PATENT OFFICE.

ANDREW J. HILL, OF ROSWELL, TERRITORY OF NEW MEXICO.

DETERGENT.

SPECIFICATION forming part of Letters Patent No. 623,716, dated April 25, 1899.

Application filed April 20, 1897. Serial No. 632,980. (No specimens.)

*To all whom it may concern:*

Be it known that I, ANDREW J. HILL, a citizen of the United States, residing at Roswell, in the county of Chaves and Territory of New Mexico, have invented a new and useful Cleansing Compound, of which the following is a specification.

My invention relates to a cleansing compound especially adapted for use in the process of scouring wool, but also adapted for other analogous purposes, in connection, for instance, with the toilet; and the object in view is to provide a compound possessing certain cleansing properties which shall consist solely of vegetable substances and which may be prepared either as a liquid or jelly or as a powder, according to the purpose for which it is specially intended, the proportions of the several ingredients entering into the composition remaining, however, approximately the same under the different conditions of its use.

In preparing the compound forming the essential feature of my invention I employ the roots of two species of yucca—namely, the *Yucca baccata* and *Yucca angustifolia*, known familiarly in Mexico and other places to which they are indigenous as "palmier amola" and "palma amola," respectively—the root of an agave or American aloe belonging to the *Amoryllis* family—namely, *Agave maculosa*, and also known as "lechuguilla," the familiar or local name of which is "litchigee amola"—and a moss known as "Irish moss," (*Chondrus crispus*,) found on the sea-coast of Ireland and familiarly known as "carrageen." The proportions in which these ingredients are combined in preparing the compound are three pounds of the dried moss to one hundred pounds of the roots of the three species of plants above mentioned, the three roots being combined in the following proportions: *Yucca baccata*, four parts; *Yucca Angustifolia*, three parts; *Agave maculosa*, two parts. It will be understood that these proportions are not invariable.

In order to facilitate the explanation of the method of preparing my compound for its several uses, I have illustrated in the drawings a series of articles or utensils adapted to be employed in carrying out my process, as follows:

Figure 1 is a vertical section of a receptacle of annular construction which may be employed in the extraction of the gums of roots. Fig. 2 is a transverse horizontal section of the same.

That form of compound embodying my invention which is designed for use in the scouring of wool or fabrics of a nature analogous thereto is a liquid or jelly, and in preparing the same I have found it desirable to proceed as follows: After thoroughly washing the three roots which enter into the compound and drying the same they are ground in any suitable manner to form a course meal, which is placed in a receptacle and subjected to a moist heat of such a degree as to soften the gum forming a constituent part of each of the roots. In practice I prefer to place the meal or ground roots in an annular receptacle, which may be constructed, as shown in the drawings, of an exterior cylinder 1, having a plurality of longitudinal grooves or channels 2, and an interior wooden tube or cylinder 3, of which the walls are perforated and spaced from the exterior cylinder to form an annular receptacle. The cylinders are adapted to be terminally closed when in use, and moist heat, such as steam or its equivalent, should be introduced into the interior cylinder and being brought by the annular arrangement of the meal into contact with all parts thereof. The heating of the meal in this step of the process must be conducted at a moderate temperature in order to avoid injury to the contents of the receptacle, that temperature which I have found best adapted for the purpose being slightly below boiling-point and being continued for a period ranging from two to three hours. At the end of this length of time the gum of the roots will be in a soft or fluid condition, whereby it may be readily extracted by subjecting the meal to pressure, which may be accomplished in any of the well-known ways common in analogous arts and needing no specific illustration in this connection.

Now referring to the "carrageen" or moss, the same should be thoroughly cleaned and then subjected to heat, as in a steam-tight chest or receptacle containing sufficient water to partially cover the moss. A high temperature is maintained until the moss is dissolved and passes into solution in the water, thus forming a substance resembling jelly, which is subsequently combined with the extract or gum of the roots while the latter is still warm from the effect of the steam to which the roots were subjected during the extraction of the gum. After combining the solution of the moss with the gum of the roots the product is allowed to cool, when it forms a thick syrup or jelly, in which condition it is used. In applying this form of the compound in the operation of scouring wool a suitable proportion of the jelly is placed in a vat containing the wool or fabrics, and after being thoroughly mixed therewith water is admitted, and means are employed for agitating the contents of the vat. The quantity of water is increased after a certain amount of agitation of the contents of the vat and is then allowed to escape at one point as it is admitted at another, thereby thoroughly cleansing the articles.

Various other combinations of the ingredients above specified may be adopted, of which it will be necessary to specify only one, which I have found to be particularly suitable for use as a toilet article adapted for cleansing the skin, removing dandruff, &c. The most convenient form of the compound when it is to be used for toilet purposes is a powder, and in order to prepare such a powder I prefer to first cleanse the three species of roots, then crush the same, and expose them to a heat sufficient to dry them. When thoroughly dried, I pack the crushed roots in boxes or receptacles in layers alternately disposed with layers of the solution of moss prepared in accordance with the foregoing process, (by subjecting moss in water to an excessive heat.) Having arranged these alternate layers of crushed roots and moss solution, the materials are allowed to stand until the moss solution has permeated or impregnated the roots. The contents of the receptacles are then removed and thoroughly dried, after which they are ground to form a fine meal or powder, which is subsequently bolted to separate any portions of fiber or coarse particles. The resulting powder, which is soluble in either cold or warm water, is then ready for use.

In connection with the cleansing of wool, clothing, and all kinds of woolen and silk goods an important advantage of the compound is that it may be used in either cold or warm or hard or soft water and is capable of dissolving the greases and leaving the material both clean and soft.

Having described my invention, what I claim is—

1. A cleansing compound comprising the roots of *Yucca baccata*, *Yucca angustifolia* and *Agave maculosa*, and carrageen or Irish moss, combined substantially in the proportions specified.

2. A compound for cleansing wool, &c., comprising the expressed gums of *Yucca baccata*, *Yucca angustifolia* and *Agave maculosa* roots, and a solution of carrageen or Irish moss, combined substantially in the proportions specified.

In testimony that I claim the foregoing as my own I have hereto affixed my signature in the presence of two witnesses.

ANDREW J. HILL.

Witnesses:
F. P. LEA,
H. B. BIBB.